Sept. 4, 1956
R. C. CHATTIN
2,761,369
EXTENSIBLE ROTOR
Filed Jan. 23, 1951
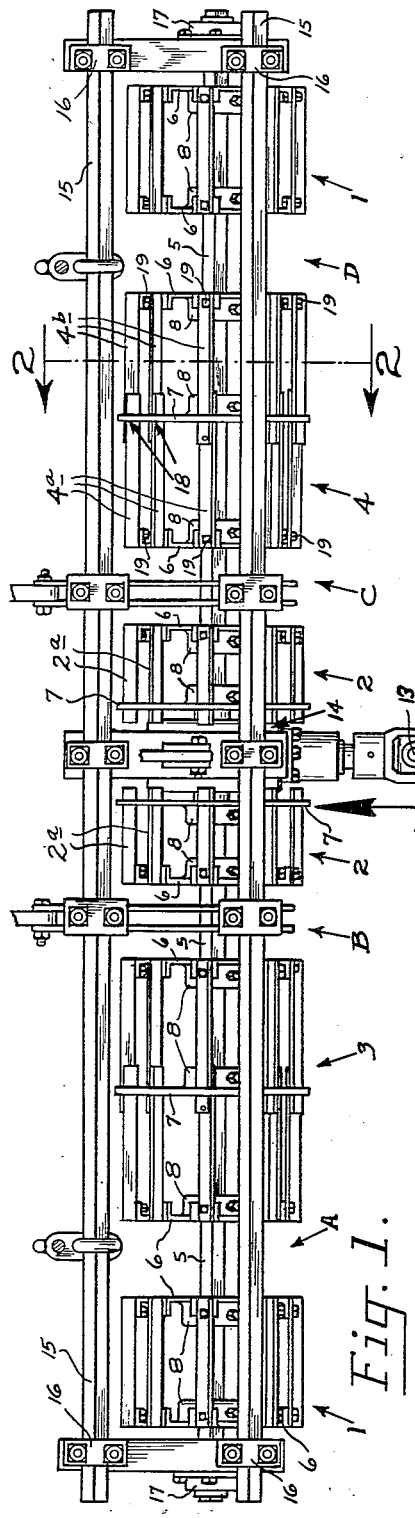
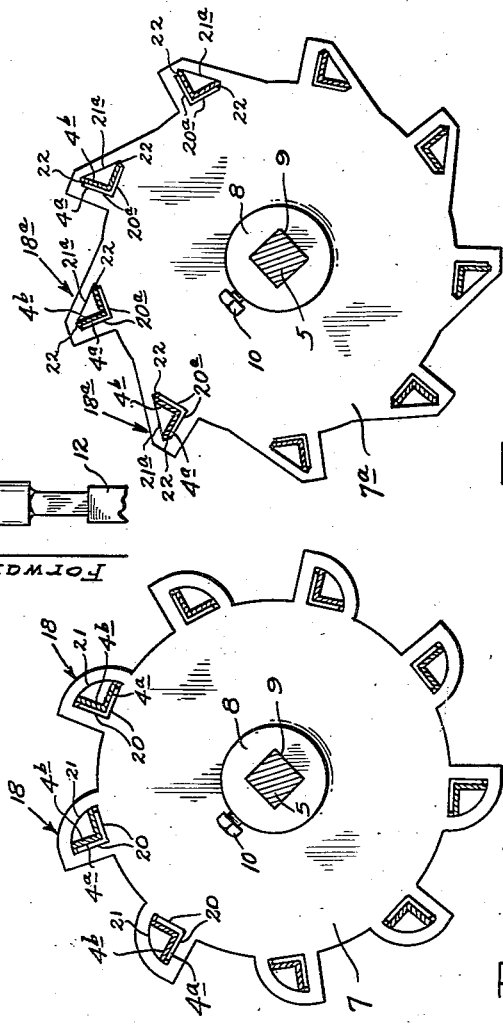
INVENTOR.
Robert C. Chattin
BY
Atty.

United States Patent Office 2,761,369
Patented Sept. 4, 1956

2,761,369

EXTENSIBLE ROTOR

Robert C. Chattin, Boise, Idaho

Application January 23, 1951, Serial No. 207,333

7 Claims. (Cl. 97—215)

This invention is directed to a farm-type mulching rotor having a plurality of telescopic and longitudinally adjustable blade sets spaced about the periphery thereof. Conventionally, a plurality of such rotors are arranged in spaced relationship along a common, power-driven shaft pendent from a farm tractor to condition the soil about new crops or to prepare the soil for planting. The subject matter of this invention is an improvement over that disclosed in the copending application Serial No. 83,579, filed March 26, 1949, now Patent No. 2,694,967, issued November 23, 1954, and entitled Row Crop Cultivator of which I am assignee of one-half interest.

Mulching machines of the type adapted to employ my novel rotors are gaining increased popularity among the farmers of America. In particular, those farmers located in areas where irrigation is the accepted method of applying moisture to crops find that a rotary mulcher is indispensible for conserving soil moisture through controlled mulching, for preparing the soil for planting, for cultivating against weed growth, for loosening or breaking up crusted soil, and for close cultivating between row crops. I have found that the conventional mulching machine is inadequate to perform these diverse mulching activities with dispatch and efficiency. More particularly, I have found that these diverse activities, as amplified by the peculiar soil conditions encountered in irrigation areas, require a mulching rotor which is adjustable in length and which possesses superior structural strength. Accordingly, I have turned my inventive efforts toward the provision of a rotor possessing these advantages.

The necessity for a rotor possessing the advantages above mentioned is best illustrated with respect to the cultivation of row crops; it being remembered, with respect to the irrigation areas, that the top soil may be hard and crusty during the growing season, yet the same soil may be soft and moist during the planting season. By way of example, the farmer seeking to capture an early market by early spring planting, may be confronted with a wet, packed soil and with adverse weather conditions. Experience has shown that a rotary mulching machine functions ideally in the preparation of such a soil for planting under such conditions. Sequentially, the farmer employing a mulching machine will first set his rotor blades to cover as wide a swath as possible. Thereafter, he will make a pass with his mulcher rigged tractor to fluff and mulch the seed bed while, at the same time, trailing a planter. Later, as the young plants sprout, he will cultivate the soil closely adjacent the plant rows. Such cultivation requires a resetting of the rotor blades to span the distance between crop rows. Still later, when the top soil may have become hard and dry, the farmer will thin his crop. Thereafter, the mulcher may be utilized to level the soil and, ultimately, to cultivate about the growing rows. These latter operations call for a further adjustment of the rotor blades, since the soil can no longer be mulched so close to the growing rows. In short, the continued efficiency of a mulching machine is directly related to and is dependent upon the adjustability and structural strength of the rotor blades carried thereby. It is this twin structural requirement of adjustability and strength, however, which I have found to be lacking in the conventional mulcher.

Accordingly, one object of my invention is to provide a mulching rotor which is capable of ready longitudinal adjustment to meet the varying soil and work conditions encountered by a farmer with respect to row crops and cultivation and, more particularly, in irrigation areas.

Another object of my invention is to provide an adjustable mulching rotor having angle iron blades which are carried telescopically in novel pockets spaced about the rotor periphery, all to the end of attaining an interchangeable, structurally strong mechanism.

Toward the attainment of these objects, my rotor includes a pair of longitudinally adjustable end disks and an intermediate center disk. Each rotor blade set comprises two substantially parallel blade elements which are secured to the end disks and nest within the pocket carried by the center disk. By providing a three-sided pocket which is complementary to the blade element outline, longitudinal adjustment of each rotor length is provided, yet rotation of the blade elements individually and movement with respect to one another, is prevented.

These and other objects and advantages of my invention will be set forth in the following detailed description, taken in conjunction with the accompanying drawing, wherein:

Fig. 1 is a plan view of a 4-row mulching machine embodying the principles of my invention;

Fig. 2 is a detail view, taken substantially on the line 2—2 of Fig. 1, showing the center disk and the peripheral pockets carried thereby slidably to engage the blade elements and hold them in a nested relationship one with another; and Fig. 3 is a detail view similar to Fig. 2, but showing a modified form of the peripheral pocket within which the blade elements nests.

I have illustrated my invention with respect to a 4-row mulching machine adapted to straddle four crop rows as indicated at A, B, C, and D. To this end, four rotor sets are provided. These sets include the outboard pair 1, the inboard pair 2, and the longitudinally adjustable sets 3 and 4. Each of the rotors 1, 2, 3, and 4 is mounted upon an elongated square shaft 5 for rotation therewith. Thus, each rotor includes two end disks 6 and the rotor sets 3 and 4 include an intermediate center disk 7. A collar 8 carrying a square aperture 9 is made integral with each of the disks 6 and 7. A set screw 10 is utilized to secure each collar and disk to the square shaft 5 (see Fig. 2).

To better orient the mulching machine per se with respect to the farm tractor, I have shown in Fig. 1, a forward pointing arrow. This arrow points in the direction the tractor moves while the mulching machine is operated. Furthermore, I have indicated at 12 the drive shaft for rotating both the square shaft 5 and the rotor sets from the power take-off shaft of the tractor. Such rotation is effected through a universal 13 and a miter gear power train mechanism housed within the casing 14. In addition, the entire mulching mechanism is suspended from the cultivator bars 15 by means of the clamps 16. The square shaft 5 is journaled at its terminal ends in the bearings 17.

Turning now to the structures by means of which the longitudinal length of the rotor sets 3 and 4 may be adjusted, the rotor 4 will be used for purposes of illustration. Thus, each adjustable rotor set includes a pair of end disks 6, a center disk 7, and a plurality of blade sets spaced about the peripheries thereof. Each blade set on the rotor 4 includes two substantially parallel blade elements 4a and 4b having the mated inner ends thereof arranged to overly the center disk 7 in a nested relationship as best shown in Fig. 2.

In order to secure the blade elements 4a and 4b in nested relationship, the center disks 7 carry the peripheral pockets 18. These pockets are most economically formed by punching the metal disk 7 as with a punch press. While engaged in the manufacture of these mulching machines, however, I have found that it is almost impossible accurately to punch an L-shaped aperture to accommodate the angle iron blade elements 4a and 4b. This is for the reason that an L-shaped punch tends to bend, to shear, and to ravel the blank disk. For this reason, I find that it is necessary to utilize one of the pocket shapes 18 or 18a shown in Figs. 2 and 3, respectively.

Returning now to the slidable, nested relationship of the blade elements 4a and 4b within the pockets 18, it will be seen that each blade element is, in substance, an angle iron having two perpendicular legs. I prefer this type blade element because angle irons are a universally available stock item. The outer end of each blade element is secured, as by means of a bolt 19, to the periphery of one of the end disks 6. As shown in Fig. 2, each of the pockets 18 is formed with a three-sided outline. Two sides of this outline are straight as at 20 to form a right angle complementary to the L-shape defined by the perpendicular blade legs. The third side of each pocket 18, on the other hand, is curved as at 21 closely to encompass and grip the margins of the overlying legs on the blade elements 4b. Thus, the blade element 4a is held against rotation by the contact of the straight sides 20 and the blade element 4b. The blade element 4b, on the other hand, is held against rotation by the grip of the curved side 21 by contact with the blade element 4a. Accordingly, a strong, sure grip is maintained, yet longitudinal adjustment is provided. I deem this structure of each of the pockets 18 to be of critical importance.

In Fig. 3, I have shown a modified construction of the pockets 18a. In this modified form, each pocket includes two straight sides 20a and a third straight side 21a. In addition, the ends of the triangle thus formed in the periphery of the center disk 7a may be trimmed or lopped off somewhat as shown at 22. I have found that this pocket structure 18a, also, is readily fabricated with a punch press.

Referring again to Fig. 1, it will be seen that the inboard rotor sets 2 leave a small unworked space between the crop rows B and C when the mulcher is operated. To minimize the width of this unworked space and to allow such width to be varied at will, the blades 2a are carried between an outboard, end-type disk 6 and an inboard, center-type disk 7 rather than between two end-type disks 6. Thus, the disks 7 will clear the power train casing 14, yet the blades 2a will extend through and protrude beyond the pockets carried thereby. If desired, the blades 2a may extend beyond the disks 7 a distance up to two inches since, in practice, the bearing housing for the drive shaft 12 is approximately two inches smaller in radius than is the casing 14 in lateral width. During operation in this extended position, the inboard ends of the blades 2a will rotate about the casing 14 and just clear the said bearing housing.

In use, the farmer is often called upon longitudinally to adjust the length of the rotor sets 3 and 4 to meet varying soil and work conditions. If, for example, the rotor set 4 is to be lengthened or elongated from the position shown in Fig. 1, the bolts 10 holding the ends disks 6 are first backed off. Thereafter, the end disks are moved longitudinally away from one another. During this longitudinal movement, the blade elements 4a and 4b slide over one another within the pockets 18 or 18a. When the desired length is effected, the set screws 10 are tightened once more to fix the end disks 6 upon the square shaft 5. By virtue of the novel pocket structure 18 or 18a, the blade elements 4a and 4b are longitudinally adjustable yet relative rotation between the blade elements is prevented. Thus, a rotor structure of superior strength and adjustable length is, at all times, available.

I claim:

1. A mulching rotor, comprising a pair of end disks and an intermediate center disk mutually carrying upon the peripheries thereof a plurality of elongated telescopic blade sets which are arranged parallel to one another, and a series of pockets radially spaced about the periphery of said center disk, each said pocket including means gripping, overlying and slidably engaging a portion of a corresponding one of said blade sets to prevent radial displacement and rotation of the blade set relative to said center disk.

2. A mulching rotor, comprising a pair of end disks and an intermediate center disk all arranged for mutual rotation about a common longitudinal axis, a plurality of elongated telescopic blade set means mounted upon the peripheries of said end disks and said center disk for rotation therewith, means adjustably mounting said end disks for longitudinal movement toward and away from one another selectively to telescope said blade sets and vary the overall length of said rotor, each blade set including two blade elements having mated inner ends arranged to overly said center disk in a nested relationship one with another, and a series of pockets radially spaced about the periphery of said center disk, each said pocket including means overlying and slidably engaging the nested ends of one blade set to prevent rotation and movement radially out from said center disc.

3. A mulching rotor, comprising a pair of end disks and an intermediate center disk mutually carrying upon the peripheries thereof a plurality of elongated telescopic blade sets which are arranged parallel to one another, each blade set including two substantially parallel blade elements having mated inner ends arranged to overly said center disk in a nested relationship one with another, each blade element having two perpendicular legs defining an L-shaped angle and being secured between one of said end disks and said center disk to span the distance therebetween, and a series of pockets radially spaced about the periphery of said center disk, each said pocket including means slidably engaging the nested ends of one blade set to prevent rotation thereof, each said pocket having a three-sided outline with two straight sides forming a right angle complementary to the L-shaped angle of said perpendicular legs.

4. A mulching rotor, comprising a pair of end disks and an intermediate center disk all arranged for mutual rotation about a common longitudinal axis, a plurality of elongated telescopic blade set means mounted upon the peripheries of said end disks and said center disk for rotation therewith, means adjustably mounting said end disks for longitudinal movement toward and away from one another selectively to telescope said blade sets and vary the overall length of said rotor, each blade set including two substantially parallel blade elements having mated inner ends arranged to overly said center disk in a nested relationship one with another, each blade element having two perpendicular legs defining an L-shaped angle and being secured between one of said end disks and said center disk to span the distance therebetween, and a series of pockets radially spaced about the periphery of said center disk, each said pocket including means slidably engaging the nested ends of one blade set to prevent rotation thereof, each said pocket having a three-sided outline with two straight sides forming a right angle complementary to the L-shaped angle of said perpendicular legs, the other side of each pocket being curved and slidably engaging the margins only of said legs to accommodate longitudinal leg movement but to prevent rotation.

5. In a rotatably mounted mulching rotor, two longitudinally spaced end disks and an intermediate center disk mated and correlated one to another and mounted for mutual rotation as a unit, a plurality of elongated telescopic blade sets carried upon the peripheries of and spanning the distance between said end disks, a plurality of pockets carried about and piercing the periphery of said center disc and having closed bounding peripheries, each blade set including two blade elements having mated inner ends arranged to overly said center disk in a nested relationship one with another within a companion one of said pockets, each blade element being secured between one of said end disks and said center disk to span the distance therebetween, means adjustably mounting said end disks for longitudinal movement toward and away from one another selectively to telescopic said blade sets and vary the overall length of said rotor, and securing means for fixing said end disks and blade sets in adjusted position.

6. In a rotatably mounted mulching rotor, two longitudinally spaced end disks and an intermediate center disk mated and correlated one to another and mounted for mutual rotation as a unit, a plurality of elongated telescopic blade sets carried upon the peripheries of and spanning the distance between said end disks, each blade set including two blade elements each comprising two perpendicular legs and having mated inner ends arranged to overly said center disk in a nested relationship one with another, each blade element being secured between one of said end disks and said center disk to span the distance therebetween, and a series of pockets radially spaced about the periphery of said center disk, each said pocket including means slidably engaging the nested ends of one blade set to prevent rotation thereof, said means including a pocket outline complementary to said perpendicular legs.

7. In a rotatably mounted mulching rotor, two longitudinally spaced end disks and an intermediate center disk mated and correlated one to another and mounted for mutual rotation as a unit, a plurality of elongated telescopic blade sets carried upon the peripheries of and spanning the distance between said end disks, each blade set including two blade elements having mated inner ends arranged to overly said center disk in a nested relationship one with another, each blade element being secured between one of said end disks and said center disk to span the distance therebetween, and a series of pockets radially spaced about the periphery of said center disk, each said pocket including means slidably engaging the nested ends of one blade set to prevent rotation thereof, each said pocket having a three-sided outline with two straight sides forming a right angle, the other side of each pocket slidably engaging the margins only of said legs to accommodate longitudinal leg movement but to prevent rotation.

References Cited in the file of this patent

UNITED STATES PATENTS

| | | |
|---|---|---|
| 619,531 | Bartlett et al. | Feb. 14, 1899 |
| 1,025,961 | Clark | May 14, 1912 |
| 1,364,720 | Cook | Jan. 4, 1921 |
| 1,606,324 | Short | Nov. 9, 1926 |
| 2,358,744 | Stepanoff | Sept. 19, 1944 |

FOREIGN PATENTS

| | | |
|---|---|---|
| 204,486 | Great Britain | Oct. 4, 1923 |
| 516,810 | Germany | Jan. 28, 1931 |
| 67,524 | Denmark | Aug. 30, 1948 |